United States Patent
Takizawa

(10) Patent No.: US 7,626,659 B2
(45) Date of Patent: Dec. 1, 2009

(54) ELECTRO-OPTICAL DEVICE PRODUCING WIDER REPRODUCIBLE COLOR RANGE HAVING COMPLEMENTARY COLOR SUB-PIXEL IN TRANSMISSION REGION AND NO REFLECTION REGION AMONG SUB-PIXELS FORMING THREE PRIMARY-COLOR FILTER SYSTEM

(75) Inventor: Keiji Takizawa, Azumino (JP)

(73) Assignee: Epson Imaging Devices Corporation, Nagano (JP)

( * ) Notice: Subject to any disclaimer, the term of this patent is extended or adjusted under 35 U.S.C. 154(b) by 621 days.

(21) Appl. No.: 11/436,620

(22) Filed: May 19, 2006

(65) Prior Publication Data

US 2006/0274233 A1    Dec. 7, 2006

(30) Foreign Application Priority Data

May 19, 2005   (JP)   ............................. 2005-146425
Oct. 18, 2005  (JP)   ............................. 2005-303254

(51) Int. Cl.
   G02F 1/1335   (2006.01)
(52) U.S. Cl. ........................ 349/106; 349/108; 349/109; 349/114
(58) Field of Classification Search ......... 349/106–109, 349/114
See application file for complete search history.

(56) References Cited

U.S. PATENT DOCUMENTS

| 7,463,317 B2 * | 12/2008 | Takizawa et al. ............ 349/114 |
| 2002/0191130 A1 | 12/2002 | Liang et al. |
| 2003/0231267 A1 | 12/2003 | Murai et al. |

FOREIGN PATENT DOCUMENTS

| EP | 1 251 389 A2 | 10/2002 |
| JP | A-2001306023 | 11/2001 |
| JP | A 2002-258029 | 9/2002 |
| JP | A-2004-191646 | 7/2004 |

* cited by examiner

Primary Examiner—John Heyman
(74) Attorney, Agent, or Firm—Oliff & Berridge, PLC

(57) ABSTRACT

An electro-optical device includes a plurality of sub-pixels each having a light transmission region and a light reflection region, wherein coloration layers of a same color are disposed on each of the light transmission region and light reflection region of each sub-pixel, the coloration layers being constituting a plurality of colors, and color display is implemented for either transmission display or reflection display, the transmission display being implemented by the light transmission region and the reflection display being implemented by the light reflection region, and wherein the number of colors of the coloration layers disposed in the light transmission regions is more than that of the coloration layers in the light reflection regions, whereby a reproducible color range in the transmission display is set to be wider than the reproducible color range in the reflection display, with respect to the xy chromaticity diagram.

24 Claims, 7 Drawing Sheets

ELECTRO-OPTICAL DEVICE PRODUCING WIDER REPRODUCIBLE COLOR RANGE HAVING COMPLEMENTARY COLOR SUB-PIXEL IN TRANSMISSION REGION AND NO REFLECTION REGION AMONG SUB-PIXELS FORMING THREE PRIMARY-COLOR FILTER SYSTEM

This application claims the benefit of Japanese Patent Application No. 2005-146425, filed May 19, 2005, and Japanese Patent Application No. 2005-303254, Oct. 18, 2005. The entire disclosures of the prior applications are hereby incorporated by reference herein in their entirety.

BACKGROUND

1. Technical Field

The present invention relates to an electro-optical device and an electronic apparatus, and particularly, to the structure of an electro-optical device having a color filter including a plurality of coloration layers, which makes possible a reflection display and transmission display of colors realized by the color filter.

2. Related Art

Generally, a color filter has been formed in a variety of electro-optical devices in addition to a liquid crystal display to make possible a color display. The color filter, for example, is configured by disposing any one of coloration layers of a plurality of colors for each pixel, for example, red, green and blue, and arranging the coloration layer of the plurality of colors in a predetermined pattern. The coloration layer, for example, is formed by a photolithographic method using a photosensitive resin including a coloring material (such as pigment or dye).

Meanwhile, there has been known a display device in which the transmission display visible by the light of the backlight is realized by disposing a back light in the rear of the electro-optical device under a relatively dark environment such as indoor or in-car, and the reflection display visible by the outside light is realized by turning off the backlight under a bright environment such as outdoor. In this type of device, a light transmission region for transmitting the light and a light reflection region for reflecting the light are, respectively, provided within each pixel, whereby the transmission display is realized by using the light transmission region and the reflection display is realized by using the light reflection region.

In this case, there is a problem that the coloration layers need to be formed in both light transmission region and light reflection region to make possible the color display in both transmission display and reflection display, but since the light of the backlight passes through the coloration layer in the light transmission region only at one time, while the outside light passes through the coloration layer back and forth at two times, it is possible to achieve the bright display, but it is difficult to raise the color saturation in the transmission display, while it is easy to raise the color saturation, but it is difficult to achieve the bright display. Consequently, in general, it is necessary that the coloration layer of the light transmission region is higher than that of the light reflection region in color saturation.

Since it is necessary to change the amount of the coloring material involved in the coloration layer to give the layers of the light reflection region and light transmission region a different color saturation, there is shown a problem that the kind of coloration layer increases, whereby the manufacturing process gets complicated. Consequently, it has been known that the structure made by laminating two-color coloration layers of coloration layers of three colors such as cyan, magenta and yellow of complementary-color system is disposed in the light transmission region to form three colors such as red, green and blue of primary-color system, while the color filter for the liquid crystal display of the structure that the above-referenced two colors are, in monolayer, disposed in the light reflection region is used, whereby the brightness of the reflection display can be achieved as well as the color saturation of the transmission display can be secured. (For instance, hereinafter, see JP-A-2002-258029.)

However, in the electro-optical device that makes possible both above-referenced reflection display and transmission display, since establishing the light reflection region lowers a substantial aperture ratio of the reflection display and establishing the light transmission region lowers the substantial aperture ratio of the transmission display, there is a problem that it is difficult to secure the brightness of the display and realize the balance of the visibility of both displays.

Especially, it is necessary to secure the area of the light reflection region to some extent to consider the brightness preferentially from the luminance or contrast of the reflection display originally still lower than the luminance or contrast of the transmission display, while it is necessary to improve the display quality of the color filter of which area is within the limited range of the light transmission region to elevate the display quality of the transmission display from the transmission display requiring high display quality (contrast or color reproducibility). However, if the coloration layers of the light reflection region and light transmission region are formed by different materials to construct the high-quality transmission display, there is a problem that the number of manufacturing processes of the color filter augments, whereby the manufacturing cost is raised.

SUMMARY

To solve the problems, an advantage according to an aspect of the present invention is to realize a color filter structure capable of easily securing the display quality and the balance of both displays, and an electro-optical device having the same by differentiating the color components to realize the color display of a transmission display and a reflection display.

An electro-optical device according to the invention includes a plurality of sub-pixels each having a light transmission region and a light reflection region, wherein coloration layers of a same color are disposed on each of the light transmission region and light reflection region of each sub-pixel, the coloration layers being constituting a plurality of colors, and color display is implemented for either the transmission display or the reflection display, the transmission display being implemented by the light transmission region and the reflection display being implemented by the light reflection region, and wherein the number of colors of the coloration layers disposed in the light transmission regions is more than that of the coloration layers in the light reflection regions, whereby a reproducible color range in the transmission display is set to be wider than the reproducible color range with respect to the reflection display, with respect to the xy chromaticity diagram.

When the number of colors of the coloration layer disposed in the light transmission region is more than that of the coloration layer in the light reflection region, a reproducible color range in the reflection display is set to be wider than the reproducible color range in the transmission display, with respect to the xy chromaticity diagram, whereby the improvement of the color reproducibility of the color display can be attempted. That is, the improvement of the transmission display with high request for color reproducibility is attempted, whereby the high-quality electro-optical device can be easily constructed.

According to the invention, it is preferable that the plurality of colors of the coloration layer has three-primary-color-system filter colors and filter colors of a complementary-color system different from the three-primary-color-system filter colors, whereby the coloration layer disposed in the light reflection region constitutes the three-primary-color-system filter colors and the coloration layer disposed in the light transmission region is constituted by the three-primary-color-system filter colors and the filter colors of the complementary-color system different from the three-primary-color-system filter colors. At least one color of the filter colors of complementary-color system is added to the filter colors of primary-color system, whereby the color reproducibility of the color display can be further elevated.

According to the invention, it is preferable that the light reflection region for the reflection display is not provided on the sub-pixel having the light transmission region in which the coloration layer of the complementary-color-system filter colors is disposed. As described above, since the luminance or contrast of the reflection display is considerably lower than that of the transmission display, constructing the display by only the basic three color components has few influence on the display quality. While, since the area of the light transmission region displaying the color different from three colors can be enlarged, the luminance and color quality of the transmission display can be further elevated.

According to the invention, it is preferable that at least one of the complementary-color-system filter colors is cyan. Using cyan can elevate the reproducible color range most effectively.

According to the invention, it is preferable that the area of the sub-pixel in which the coloration layer of the complementary-color-system filter colors is disposed is smaller than that of the sub-pixel in which the coloration layer of the primary-color-system filter colors is disposed. In the sub-pixels in which the coloration layer of the complementary-color-system filter colors is disposed, since it is preferable that the light transmission region is established, the sub-pixel may be constructed smaller than other sub-pixels requiring both light transmission region and light reflection region. Further, as described above, the area of the pixel can be reduced, whereby the display can be easily attempted in high definition.

Further, according to another aspect of the invention, an electro-optical device for implementing transmission display by means of the light transmission region and reflection display by means of the light reflection region, includes a light transmission region, a light reflection region, sub-pixels corresponding to three colors in each of which a coloration layer of one color of the three colors is disposed in each of the light transmission region and light reflection region, and at least one sub-pixel in which a coloration layer of a color different from the three colors is disposed in the light transmission region, wherein the transmission display implements the color display using the three colors of the coloration layers disposed in the light transmission regions of the three sub-pixels corresponding to the three colors and the color different from the three colors of the coloration layer disposed in the light transmission region of the at least one sub-pixel, and wherein the reflection display implements color display by the three colors of the coloration layers disposed in the light reflection regions of the three sub-pixels corresponding to the three colors.

According to the invention, in the three pixels, the coloration layers are formed in each of the light transmission region and reflection region, whereby the reflection display can be colorized on the coloration layers of three colors, while in at least one pixel, the light transmission region in which at least coloration layer of at least one color different from the three colors is provided and the transmission display can be displayed in four colors or more, high color reproducibility can be achieved. As the result, the display quality of the transmission display, and the balance of the transmission display and reflection display can be improved. Particularly, since the transmission display can be displayed in four colors or more, whereby a wide range of colors can be reproduced without raising the color saturations of respective colors, it becomes possible to set the coloration layers of three colors constituting the reflection display to the very suitable color saturations for securing the brightness. Accordingly, even though the coloration layers of basic three colors are constructed in the light transmission region and light reflection region by a common coloring material, the color reproducibility of the transmission display and the balance of the brightness of the reflection display can be secured.

It is preferable that the light transmission region in the at least one sub-pixel has a lager area than the light transmission region in the three sub-pixels corresponding to the three colors. As described above, since the light transmission region of at least one sub-pixel has the larger area than the light transmission region of other three sub-pixels, in the color display, the contribution to the color quality can be raised by colors different from the basic three colors, whereby the quality of the color display can be effectively improved.

According to the invention, it is preferable that the light reflection region is not provided on the at least one sub-pixel. As described above, since the luminance or contrast of the reflection display is considerably lower than that of the transmission display, constructing the display by only the basic three-color components has few influences on the display quality. While, since the area of the light transmission region displaying the color different from three colors can be enlarged, the luminance and color quality of the transmission display can be further elevated.

According to the invention, the at least one sub-pixel has the same area as the three sub-pixels corresponding to the three colors. As described above, since the display region is constructed by the arrangement of the sub-pixel having the same area, the conventional general arrangement structure can be used as it is.

According to the invention, it is preferential that the at least one sub-pixel has a smaller area than the three sub-pixels corresponding to the three colors. As described above, reducing the area of the sub-pixel different from the basic three sub-pixels can constrain the deterioration of the display quality cased by the lowering of the high definition. Particularly, if the light transmission region of at least one-sub-pixel is set to the same as the light transmission region of other three pixels in area, the pixel is easily controlled in reproducing the color.

According to the invention, it is preferable that the three colors are primary-color-system filter colors and the color different from the three colors is a complementary-color-system filter color. At least one color of the filter colors of complementary-color system is added to the filter colors of primary-color system, whereby the color reproducibility of the color display can be further elevated. That color different from the three colors is cyan is most effective to widely secure the color reproduction range.

An electro-optical device according to another aspect of the invention includes a plurality of sub-pixels each having a light transmission region and a light reflection region, wherein coloration regions of a same color are disposed on each of the light transmission region and light reflection region of each sub-pixel, the coloration layer constituting a plurality of colors, and color display is implemented for either transmission display or reflection display, the transmission display being implemented by the light transmission region and the reflection display being implemented by the light reflection region, and wherein the number of colors of the coloration layers disposed in the light transmission regions is more than that of the coloration layers in the light reflection regions, whereby a reproducible color range in the transmission display is set to be wider than the reproducible color range in the reflection display, with respect to the xy chromaticity diagram.

According to the invention, since the number of colors of the coloration layers disposed in the light transmission regions is more than that of the coloration layers in the light reflection regions, a reproducible color range in the transmission display is set to be wider than the reproducible color range in the reflection display, with respect to the xy chromaticity diagram, whereby the color reproducibility of the color display of the transmission display can be improved. That is, attempting the improvement of the transmission display having high request for the color reproducibility permits constructing a high-quality electro-optical device as a whole.

It is preferable that the coloration regions include a coloration region of a blue-color-system color, a coloration region of a red-color-system color and coloration regions of two colors selected from among colors ranging from blue to red in the range of visible light in which the color is changed in accordance with wavelength, wherein the coloration region in the light reflection region includes the coloration region of the blue-color-system color, the coloration region of the red-color-system color and one of the coloration regions of two colors selected from among colors ranging from blue to yellow, and wherein the coloration region in the light transmission region includes the coloration region of the blue-color-system color, the coloration region of the red-color-system color and the coloration regions of two colors selected from among colors ranging from blue to yellow. The number of colors of the coloration layer disposed in the light transmission region is one more than that of the coloration layer in the light reflection region by one color, whereby the color reproducibility can be further improved. Here, it is effective that the coloration regions of two colors selected from among colors ranging from blue to yellow includes the coloration region ranging from blue to green and the coloration region ranging from green to orange so as to secure the reproducible color range widely.

According to the invention, it is preferable that the coloration region includes a first coloration region in which the peak of the wavelength of light is in the range of 415 to 500 nm, a second coloration region in which the peak is in the range of 600 nm or more, a third coloration region in which the peak is in the range of 485 to 535 nm, and a fourth coloration region in which the peak is in the range of 500 to 590 nm, wherein the coloration region in the light reflection region includes the first coloration region, the second coloration region, and one of the third coloration region and the fourth coloration region, wherein the coloration region in the light transmission region includes the first coloration region, the second coloration region, the third coloration region, and the fourth coloration region. The number of colors of the coloration layer disposed in the light transmission region is one more than that of the coloration layer in the light reflection region by one color, whereby the color reproducibility can be further improved. Here, it is effective that the third coloration region is the coloration region in which the peak of the wavelength of light transmitting the coloration region is in the range of 495 to 520 nm and the fourth coloration region is the coloration in which the peak of the wavelength of light transmitting the coloration region is in the range of 510 to 580 nm so as to secure the reproducible color range.

According to the invention, it is preferable that the light reflection region for the reflection display is not provided on the sub-pixel having the light transmission region in which one of the coloration regions of two colors selected from among colors ranging from blue to yellow is disposed. As described above, since the luminance or contrast of the reflection display is considerably lower than that of the transmission display, constructing the display only in the coloration region of three colors has few influence on the display quality, while the area of the light transmission region in which color different from the three colors is displayed in the transmission display, the luminance and color quality of the transmission display can be further elevated.

According to the invention, it is preferable that the light reflection region for the reflection display is not provided on the sub-pixel having the light transmission in which one of the third coloration region and the fourth coloration region is disposed. As described above, since the luminance or contrast of the reflection display is considerably lower than that of the transmission display, constructing the display only in the coloration region of three colors has few influences on the display quality, while the area of the light transmission region in which color different from the three colors is displayed in the transmission display, the luminance and color quality of the transmission display can be further elevated.

According to the invention, it is preferable that the area of the sub-pixel in which the light reflection region for the reflection display is not provided is smaller than that of the pixel in which the light reflection region for the reflection display is provided. Since the light transmission region may be established on the sub-pixel in which the fourth coloration region (i.e. not disposed in the light reflection region but disposed in the light transmission region), it may be constructed smaller than other sub-pixel that requires both light transmission region and light reflection region, and as shown above, the pixel area can be reduced, whereby the area of the pixel can be reduced, whereby the display can be easily attempted in high definition.

An electro-optical device according to another aspect of the invention for displaying the transmission display by means of the light transmission region and the reflection display by means of the light reflection region includes a light transmission region, a light reflection region, sub-pixels corresponding to three colors in which the coloration region of one color of the three colors is disposed in each of the light transmission region and light reflection region, and at least one sub-pixel in which the coloration region of one color different from the three colors is disposed in the light transmission region, wherein the transmission display implements color display using the three colors of the coloration regions disposed in the light transmission regions of the three sub-pixels corresponding to the three colors and the color different from the three colors of the coloration regions disposed in the light transmission regions of the at least one sub-pixel, and wherein the reflection display implements the color display using the three colors of the coloration region disposed in the light reflection region of the three sub-pixels corresponding to the three colors.

According to the invention, in the three pixels, the coloration layers are formed in each of the light transmission region and reflection region, whereby the reflection display can be colorized on the coloration layers of three colors, while in at least one pixel, the light transmission region in which at least coloration layer of at least one color different from the three colors is provided and the transmission display can be displayed in four colors or more, high color reproducibility can be achieved. As the result, the display quality of the transmission display, and the balance of the transmission display and reflection display can be improved. Particularly, since the transmission display can be displayed in four colors or more, whereby a wide range of colors can be reproduced without raising the color saturations of respective colors, it becomes possible to set the coloration layers of three colors constituting the reflection display to the very suitable color saturation for securing the brightness. Accordingly, even though the coloration layers of basic three colors are constructed in the light transmission region and light reflection region by a common coloring material, the color reproducibility of the transmission display and the balance of the brightness of the reflection display can be secured.

It is preferable that the light transmission region in at least one sub-pixel has a lager area than the light transmission region in the three sub-pixels corresponding to the three colors. As described above, since the light transmission region of the at least one sub-pixel has a larger area than the light transmission region of other three sub-pixels, in the color display, the contribution to the color quality can be raised by color different from the basic three colors, whereby the quality of the color display can be effectively improved.

According to the invention, it is preferable that the light reflection region is not provided on the at least one sub-pixel. As described above, since the luminance or contrast of the reflection display is considerably lower than that of the transmission display, constructing the display by only the basic three color components has few influence on the display quality. While, since the area of the light transmission region displaying the color different from three colors can be enlarged, the luminance and color quality of the transmission display can be further elevated.

According to the invention, the at least one sub-pixel has the same area as the three sub-pixels corresponding to the three colors. As described above, since the display region is constructed by the arrangement of the sub-pixel having the same area, the conventional general arrangement structure can be used as it is.

According to the invention, it is preferable that the at least one sub-pixel has a smaller area than the three sub-pixels corresponding to the three colors. As described above, reducing the area of the sub-pixel different from the basic three sub-pixels can constrain the deterioration of the display quality cased by the lowering of the high definition. Particularly, if the light transmission region of at least one-sub-pixel is set to be the same as the light transmission region of other three pixels in area, the pixel is easily controlled in reproducing the color.

It is preferable that the coloration region corresponding to the three colors includes a coloration region of blue-color-system color, a coloration region of red-color-system color and one of two colors selected from among colors from blue to yellow in the range of visible light in which the color is changed in correspondence with wavelength, and wherein the coloration region corresponding to color different from the three colors includes one of the coloration regions of two colors selected from among colors ranging from blue to yellow. The number of colors of the coloration layers disposed in the light transmission regions is one more than that of the coloration layers in the light reflection regions by one color, whereby the color reproducibility can be further improved. Here, it is effective that the coloration regions of two colors selected from among colors ranging from blue to yellow includes the coloration region from blue to green and the coloration region from green to orange so as to secure the reproducible color range widely.

It is preferable that the coloration region corresponding to the three colors includes a first coloration region in which the peak of the wavelength of light is in the range of 415 to 500 nm, a second coloration region in which the peak is in the range of 600 nm or more, and one of a third coloration region in which the peak is in the range of 485 to 535 nm or a fourth coloration region in which the peak is in the range of 500 to 590 nm, and wherein the coloration region corresponding to color different from the three colors includes one of the third coloration region and the fourth coloration region. The number of colors of the coloration layers disposed in the light transmission regions is one more than that of the coloration layers in the light reflection regions by one color, whereby the color reproducibility can be further improved. Here, it is effective that the third coloration region is the coloration region in which the peak of the wavelength of light is in the range of 495 to 520 nm and the fourth coloration region is the coloration in which the peak of the wavelength of light is in the range of 510 to 580 nm so as to secure the reproducible color range.

An electronic apparatus according to the invention includes the electro-optical device and a unit for controlling the same described above. Since the electro-optical device according to the invention in which both transmission display and reflection display can be realized is excellent in the correspondence to the change of an external environment, particularly, it can shows the excellent effect in case of being loaded on a portable electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
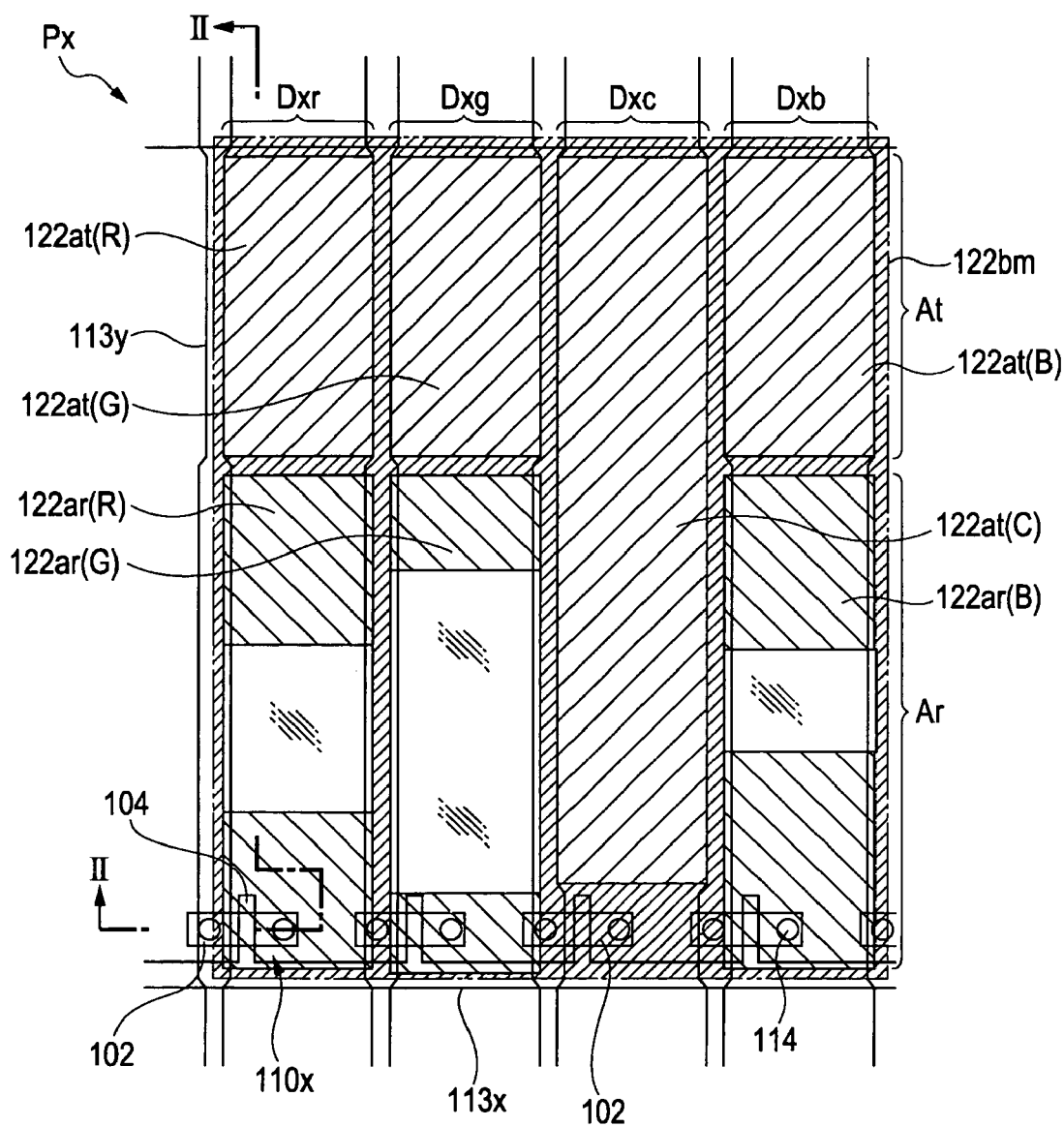
FIG. 1 is a schematic plan view showing the construction of one pixel of an electro-optical device according to a first embodiment of the invention.
Figure 2:
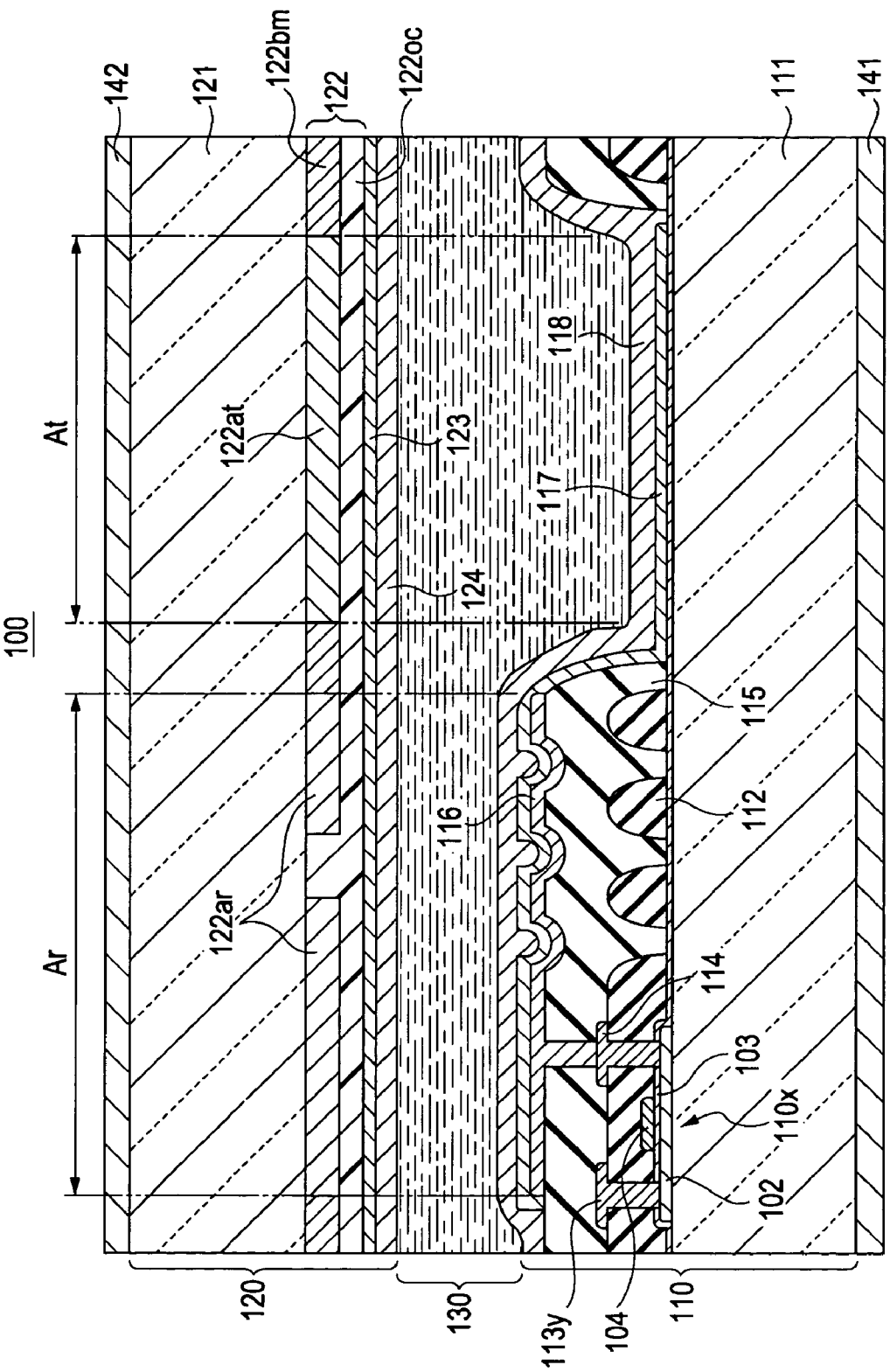
FIG. 2 is a schematically longitudinal cross-sectional view showing the cross-sectional structure of one sub-pixel of the electro-optical device according to the first embodiment.

Next, an embodiment of the present invention will be specifically described with reference to the accompanying drawings. FIG. 1 is an enlarged perspective plan view showing the internal structure of a display unit of a pixel arrangement in an electro-optical device according to a first embodiment of the invention. FIG. 2 is an enlarged longitudinal cross-sectional view showing the cross section structure of one pixel in the same electro-optical device according to a first embodiment of the invention.

In this embodiment, there is shown an aspect constituted by a liquid crystal device which is a kind of the electro-optical device. As shown in FIG. 2, a base 120 is bonded to a base 110 by being interposed with a seal material not shown at predetermined intervals and then a liquid crystal layer 130 is disposed therebetween.

In the base 110, there are formed a transparent substrate 111 made from glass or plastic, a semiconductor layer 102 constituted by a polysilicon layer on an inner surface of the substrate 111, a gate insulating film 103 constituted on the semiconductor layer 102 and a TFT (switching element) 110X having a gate electrode 104 facing a channel region of the semiconductor layer 102 via the gate insulating film 103. The gate electrode 104 is conductively connected to a scanning line 113X shown in FIG. 1.

Thereover is formed an interlayer insulating film 112 made from silicon oxide, which covers the TFT 110X and has a minute asperity on a surface by the photolithographic method. On the semiconductor layer 102, a data line 113y conductively connected to a source region of the semiconductor layer 102 and a connecting electrode 114 connected conductively connected to a drain region of the semiconductor layer 102.

Thereover is formed an interlayer insulating film 115 made from the silicon oxide, on which a reflection layer 116 constituted by a reflective conductor in addition to metal such as aluminum. The reflection layer 116 is conductively connected to the connecting electrode 114. The reflection layer 116 has a diffusive reflecting surface constituted in the minute asperity structure reflecting a surface asperity shape of the interlayer insulating film 112. The reflection layer 116 is provided in the island shape within a sub-pixel in correspondence with a light reflection region Ar provided within one sub-pixel. A light transmission region At in addition to the light reflection region Ar are provided within the sub-pixel and the reflection layer 116 is not provided therein.

On the reflection layer 116, there is an electrode 117 made from a transparent conductor such as an ITO (indium tin oxide), which covers the range covering both the light transmission region At and the light reflection region Ar throughout the whole display range within the sub-pixel. The electrode 117 is conductively connected to the drain region of the TFT 110X via the reflection layer 116. Further, in the construction of the embodiment, since the reflection layer 116 acts as a reflecting electrode, even though the electrode 117 regarded as a transparent electrode is not formed in the region covering the entirety of the reflection layer 116 (light reflection region), a part of the electrode 117 regarded as the transparent electrode is laminated onto the reflection layer 116, whereby an electrical connection may be constructed.

In the structure, there is formed an oriented film 118 made from polyimide resin. The oriented film 118 which acts to grant a liquid crystal molecule within the liquid crystal layer 130 is formed, for example, by spreading uncured resin, curing it by plasticizing and applying a rubbing process.

Meanwhile, in the base 120, there are formed a color filter 122 on an inner surface of a substrate 121 in addition to the transparent substrate 121 made from the glass or plastic. The color filter 122 has a coloration layer 122at formed in the light transmission region At and a coloration layer 122ar formed in the light reflection region Ar. These coloration layers 122at and 122ar are constituted by any one color of primary-color-system filter colors such as red, green and blue described below. The coloration layers 122at and 122ar within the same sub-pixel are basically constituted by a same color, but may be constituted by different color (color density, chromaticity and color saturation) or light transmittance. However, in this embodiment, the coloration layers 122at and 122ar are simultaneously formed by a coloration material, thereby having the same color and light transmittance.

The color filter 122 has a light shielding layer 122bm made from black resin between sub-pixels, pixels, or the light transmission region At and the light reflection region Ar. The light shielding layer 122bm prevents the reduction of contrast caused by the light leakage, light-shielding a region in which the liquid crystal molecule is not in a desired orientation state due to an inclination electric field generated in an end periphery portion of the electrodes 117 and 123, or a surface bump of the base 110 or 120.

Moreover, a protection film 122oc made from acrylic resin is formed on the coloration layers 122at and 122ar, and the light shielding layer 122bm. The protection 122oc prevents the deterioration caused by the intrusion of impurities to the coloration layers 122at and 122ar while flattening a surface of the color filter 122.

On the color filter 122, there is formed an electrode 123 made from the transparent conductor such as the ITO, on which the oriented film 124 shown above is formed. In case of this embodiment, since the TFT 110X which is a three-terminal switching element (non-linear element) is used, the electrode 117 is an independent pixel electrode for each sub-pixel and the electrode 123 is a common electrode extended to a plurality of sub-pixels (a plurality of pixels) (desirably, extended throughout the whole device). However, in case that a two-terminal switching element (non-linear element) is used instead of the TFT 110X, the electrode 123 on the opposite side thereto is extended in a direction to be crossed with the data line 113 is constructed as a strip-shaped electrode arranged in the form of a plurality of stripes toward an extending direction of the data line 113.

The liquid crystal layer 130 which is the liquid crystal layer of TN mode or STN mode using a nematic liquid crystal is constructed to control the light transmittance for each sub-pixel in cooperation with polarizing plates 141 and 142 disposed on the outside of the bases 110 and 120. In case of this embodiment, the liquid crystal layer 130 in the light transmission region At is set to be (for example, double) thicker than the liquid crystal layer 130 in the light reflection region Ar to prevent a great difference between the light modulation degree of the liquid crystal layer 130 in the transmission display using the light transmission region At and the light modulation degree of the liquid crystal layer 130 in the reflection display using the light reflection region Ar.

Moreover, in this embodiment, the difference between the thickness of the liquid crystal layer 130 in the light transmission region At and the thickness of the liquid crystal layer 130 in the light reflection region Ar is secured in dependence upon whether the interlayer insulating films 112 and 115 or not, but the difference in thickness of the transmission region At and light reflection region Ar of the liquid crystal layer 130 in dependence upon whether or not the insulating film may be secured, for example, by forming the insulating film on the color filter 122.

In this embodiment, a pixel Px shown in FIG. 1, which is an elementary unit constituting a minimum unit of a display image, has a rectangular planar shape and consists of four sub-pixels Dxr, Dxg, Dxc and Dxb. The pixel shown in the specification, which is a minimum control unit capable of controlling the light transmittance independently of each other, consists of the plurality of sub-pixels. Accordingly, the number of sub-pixels constituting the pixel Px is not necessarily limited to 4. However, in case of this embodiment, the number of sub-pixels constituting the pixel Px is an arbitrary number over 4. Further, the coloration region according to invention is contacted with each region in which the coloration layers 122ar and 122at are provided, and corresponds to each sub-pixel Dxr, Dxg, Dxc and Dxb, thereby constituting one pixel Px in the coloration layer of four colors.

The structure of a pixel shown in FIG. 2 shows the structure three sub-pixels Dxr, Dxg and Dxb from among the four sub-pixels, and corresponds to the coloration layers of three primary-color-system filter colors R (red), G (green) and B (blue). In the structure of these three sub-pixels, there are provided the light transmission region At and light reflection region Ar, respectively, whereby the respective coloration layers 122at and 122ar of R (red), G (green) and B (blue) are commonly provided in the respective regions At and Ar of the three sub-pixels as described above. Further, in these three sub-pixels Dxr, Dxg and Dxb, the area ratios of the light transmission region At and light reflection region Ar are virtually identical.

In the three sub-pixels Dxr, Dxg and Dxb, there is the coloration layer 122 is formed throughout the light transmission region At. That is, the light transmission regions At of each sub-pixel are covered with the coloration layer of the primary-color-system colors R (red), G (green) and B (blue). Meanwhile, the coloration layer 122ar is selectively formed only on a part of the light reflection region Ar as shown in figure. That is, in the light reflection region Ar, there is provided a non-coloration region which is not colorized by the light reflection layer 116 and reflects light. Further, the occupancy area ratio of the coloration layer 122ar within the light reflection region Ar is different in each of sub-pixels Dxr, Dxg and Dxb. However, the coloration layer 122ar may be covered in at least one of the light reflection regions Ar of these three sub-pixels.

Meanwhile, in the sub-pixel Dxc, there is substantively formed only the light transmission region At unlike the three sub-pixels Dxr, Dxg and Dxb. And the light transmission region At has the larger area than the light transmission region At of other three sub-pixels. In the light transmission region At of the sub-pixel Dxc, there is formed the coloration layer 122at of cyan which is a complementary-color-system filter color.

Figure 5:
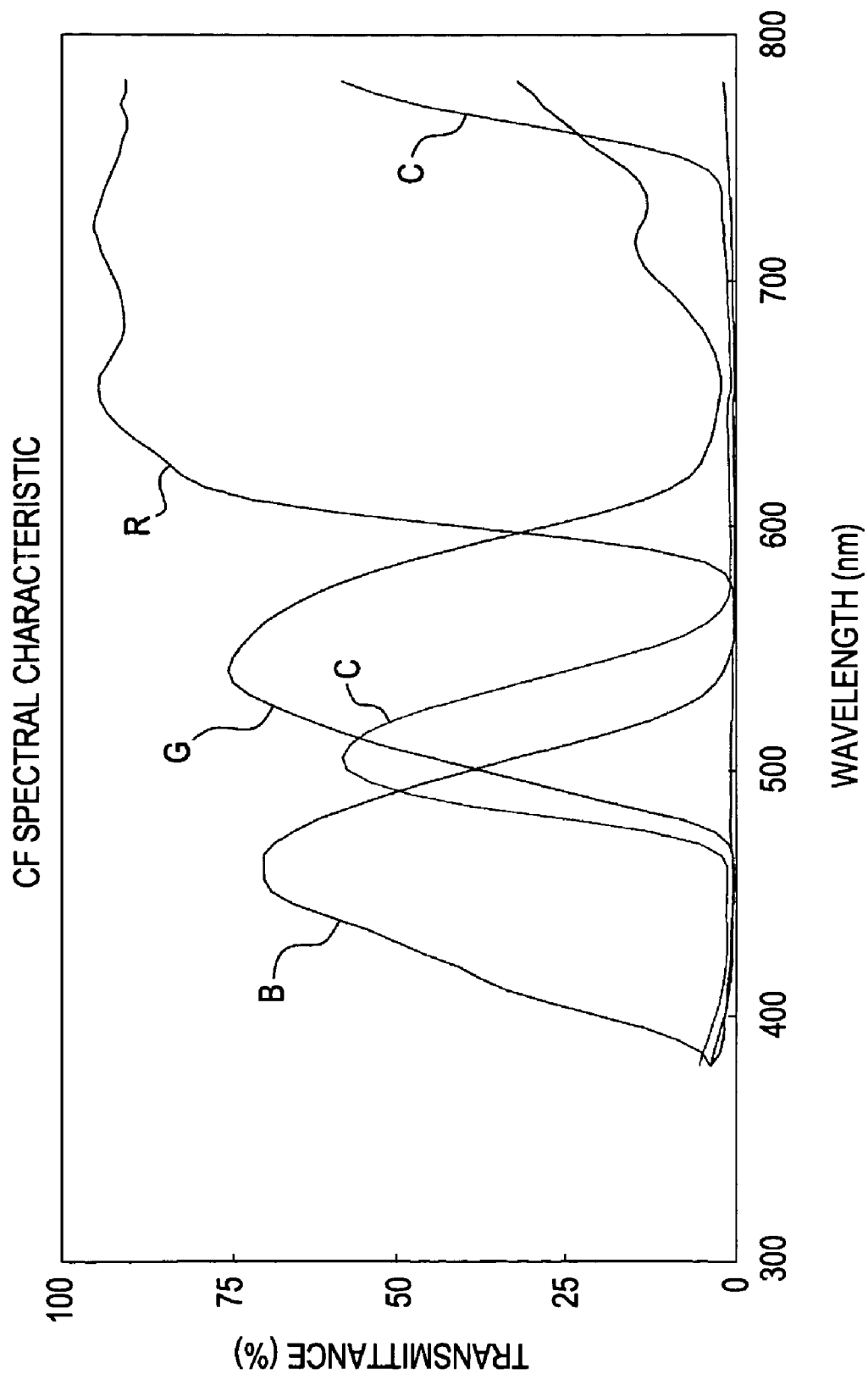
FIG. 5 shows a spectral spectrum of a coloration layer according the embodiment of the invention.

FIG. 5 shows a spectral spectrum of a coloration material of respective coloration layers 122at and 122ar of a color filter 122 used according to the embodiment of the invention. In FIG. 5, the light transmission characteristic of a red coloration layer is indicated by reference numeral R, the light transmission characteristic of a green coloration layer by reference numeral G, the light transmission characteristic of a blue coloration layer by reference numeral B and the light transmission characteristic of a cyan coloration layer by C.

Figure 6:
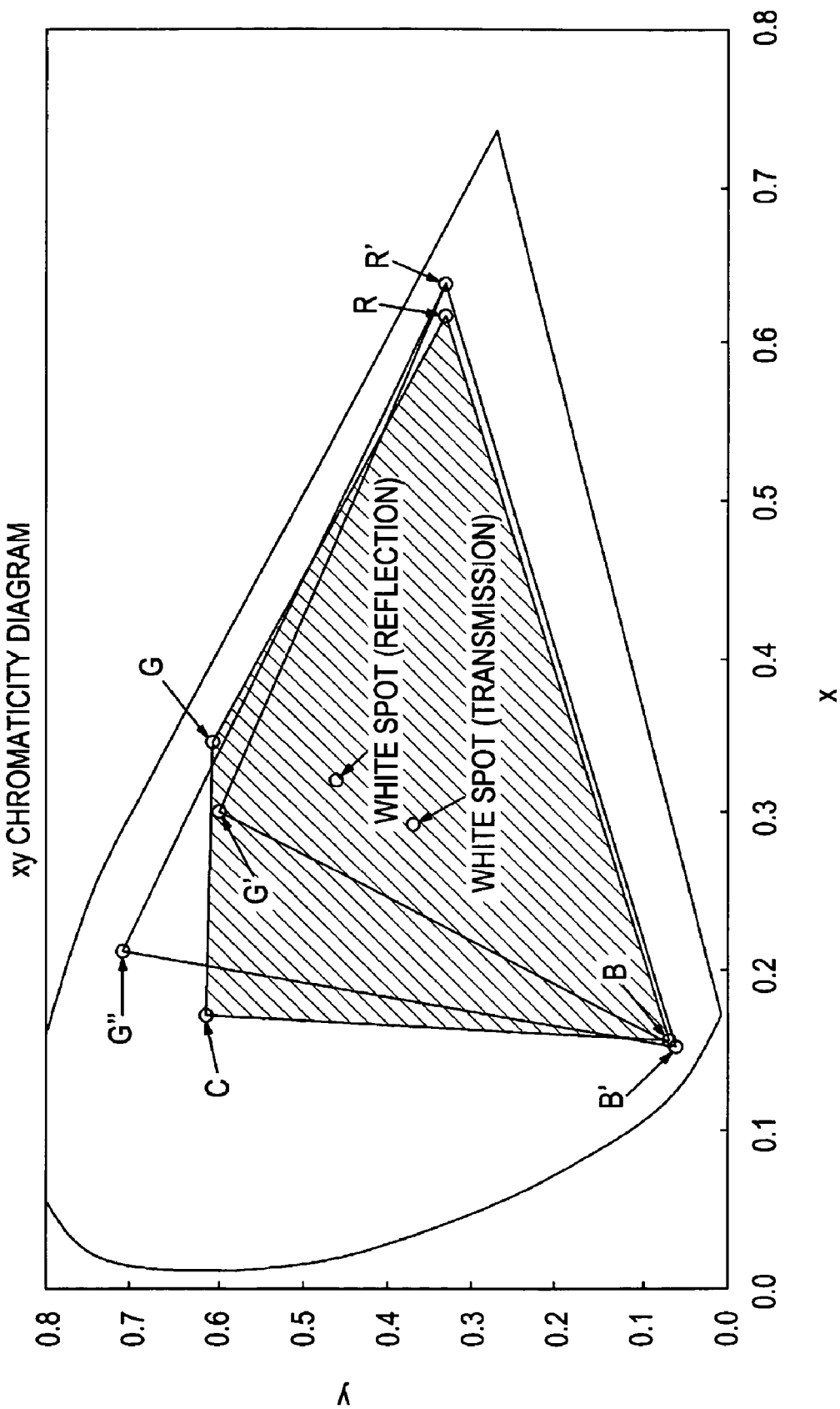
FIG. 6 is an xy chromaticity diagram showing the color and reproducible color range according to the embodiment of the invention.

Further, FIG. 6 is the xy chromaticity diagram showing a reproducible color range realized by a color filter used according to the embodiment of the invention. In FIGS. 6, R, G, B and C indicate the colors of the coloration layers having respective colors. In addition, R', G' and B' shown in FIG. 6 represent the colors very suitable as the coloration layers having red, green and blue disposed in the light reflection region Ar, and G" shown in FIG. 6 represents the color very suitable as the coloration having green disposed in the light transmission region At. Moreover, the curved line surrounding the respective spots represents the range of perceptible colors.

As shown in the chromaticity diagram, the area of a color quadrangle surrounded by R, G, B and C of this embodiment is larger than the area of a color triangle of which apexes are R', G' and B', and the reproducible color range of the transmission display of this embodiment is wider than the reproducible color range of the transmission display. Further, in case of implementing the transmission display by the conventional filter construction having three primary colors, the color triangle of R', G" and B' has wide reproducible color range to some extent, while the reproducible color range by R, G, B and C may be the same as or wider than the reproducible color range by R', G" and B' in area.

In this embodiment, not only the wide reproducible color range can be realized for the transmission display in the coloration layers of four colors such as R, G, B and C disposed in the light transmission region At, but also the bright reflection display can be realized in the coloration layers of three colors such as R, G and B disposed in the light reflection region Ar. That is, in case of implementing the construction suitable to realize the bright display by lowering the color saturation of the basic three colors of R, G and B, since the color can be expressed in four colors adding C to the three colors, the reduction of the color reproducibility in the transmission display can be constrained. In addition, in this case, since it is not necessary to change the color saturation of the coloration layers 122at and 122ar disposed in the light transmission region At and light reflection region Ar, the number of processes for manufacturing the color filter is reduced, whereby the manufacturing process is not required to be complicated and the increase of the manufacturing cost can be constrained.

The coloration layer 122at of the sub-pixel Dxc may be formed by using the coloration material with colors other than the cyan. However, it is preferable that the coloration layer 122at has a color extending the reproducible color range in addition to the basic three colors of red, green and blue. For example, it is preferable that the coloration layer 122at has a color remarkably separated from the other three colors in the chromaticity diagram, while the color with high color saturation to some extent, that is, the color positioned in the outside of the color triangle formed by the other three colors in the chromaticity diagram. The complementary-color-system colors such as cyan, magenta or yellow are most preferable as the filter colors.

Further, in this embodiment, only one sub-pixel Dcx different from the three sub-pixels is established within the pixel Px, but a plurality of additional sub-pixel different from the three sub-pixels may be provided. For example, these sub-pixels may be arranged like the sub-pixel Dxc of the embodiment, respectively by establishing two sub-pixels including the sub-pixel Dxc having the cyan coloration layer and the sub-pixel having the magenta coloration layer (not shown). As described above, one pixel Px is constructed by five sub-pixels.

Furthermore, in this embodiment, the coloration layer 122*at* disposed in the light transmission region At and the coloration layer 122*ar* disposed in the light reflection region Ar are simultaneously formed by the same material, whereby the increase of the manufacturing cost is constrained. To further elevate the color reproducibility of the transmission display and substantially secure the brightness of the reflection display, the coloration layer with relatively high color saturation is, in a full scale, disposed in the light transmission region At, while the same coloration layer is partially (selectively) disposed in the light reflection region Ar. That is, in the light reflection region Ar, the coloration layer is not disposed and the region in which the reflection layer 116 is exposed. By this construction, there can be achieved the same effect as the case that the color saturation of the coloration layer 122*ar* is lowered throughout the light reflection region Ar without significantly lowering the coloration layer's own color saturation. However, the coloration layer 122*ar* may be formed in the light reflection region Ar for at least one kind of sub-pixel of these three sub-pixels.

Further, in this embodiment, since all sub-pixels constituting one pixel have the same area, the light transmission region At of the sub-pixel Dxc is constructed to be larger than the light transmission region of the other three sub-pixels Dxr, Dxg and Dxb, whereby the aperture ratio of the transmission display gets substantially larger than the conventional aperture ratio. As the result, the display quality can be further improved while the luminance of the transmission display can be elevated. Particularly, as shown in this embodiment, in case only the light transmission region At is substantially provided in the sub-pixel Dxc, that is, the reflection layer 116 is not provided in the sub-pixel Dxc, but in case that the whole region of the sub-pixel is constituted by the light transmission region, the area of the light transmission region At in the sub-pixel Dxc can be maximized, whereby the above-referenced effect can be further elevated.

Moreover, in this embodiment, as described above, the three primary-color-system colors such as red, green and blue is used in the transmission display and reflection display, and cyan of complementary-color system is used as a filter color as a common filter color in the transmission display, particularly, the color reproducibility of green-system color range can be spread. However, in this case, the difference (the distance shown in the chromaticity diagram) in the spectrum color of green and cyan is raised, whereby the color reproducibility can be further elevated. For example, as shown in FIG. 6, if the color spot G of green filter color is isolated from the color spot of cyan further than the conventional filter colors G' and G", the area of the color triangle is augmented, the reproducible color range can be further incremented.

In the embodiment above, there has been described the aspect that the coloration region of the sub-pixel Dxc corresponds to C (cyan) if the coloration regions of the sub-pixels Dxr, Dxg and Dxb correspond to R (red), G (green) and B (blue), respectively, but the invention is constructed not only by the embodiment above, but also it may be constructed as shown below.

That is, the coloration layers with the four colors is constituted by the coloration region of two colors selected from among colors ranging from blue to yellow in the visible light scope (380 to 780 nm) of which color is changed in correspondence with the wavelength. In this case, for example, the blue-system color is limited not only to a pure blue, but also includes bruise blue or blue green. The red-system color is limited not only the pure red, but also includes orange. Further, these coloration regions may be constructed by a single coloration layer and in addition, by the coloration layer of a plurality of different colors may be constructed in piles.

Further, these coloration regions are described by using the colors, which can be established by changing the color saturation and luminosity. The specific color range of the coloration region of blue-system color is in the range of bruise blue to blue green, and more preferably, in the range of indigo to blue. The specific color range of the coloration region of red-system color is in the range of orange to red. The specific color range of the coloration region of colors selected from among colors ranging from blue to yellow is in the range of blue to green, and more preferably, in the range of blue green to green. The specific color range of the coloration region of the color excluding blue to yellow is in the range of green to orange, and more preferably, in the range of green to yellow or green to yellow green.

Here, each coloration layer need not to be constituted by the same color. For example, the green-system color, or the blue-system or yellow green-system color is used in two coloration regions selected by the color from blue to yellow. By this construction, the color reproducibility can be implemented in a wider range than the coloration region of the conventional RGB.

If the above is applied to the embodiment, for example, the coloration region of the red-system color can be disposed in the sub-pixel Dxr, the coloration layer of the blue-system color in the disposed in the sub-pixel Dxb, the coloration of green to orange in the sub-pixel Dxg and the coloration of blue to green in the sub-pixel Dxc. The colors of the sub-pixel Dxg and sub-pixel Dxc are used contrary to the above, but it is preferable that the color of the sub-pixel Dxc is in the range of blue to green.

In addition, the wide color reproducibility is described by the color, but, hereinafter, it is described by the wavelength transmitting the coloration region. The blue-system coloration region includes the coloration region in which the peak of the wavelength of light transmitting the coloration region is in the range of 415 to 500 nm, and more preferably, in the range of 435 to 485 nm. The red-system coloration region includes the coloration region in which the peak of the wavelength of light transmitting the coloration region is in the range of 600 nm or higher, and more preferably, in the range of 605 nm or higher. The coloration region selected from among colors ranging from blue to yellow includes the coloration layer in which the peak of the wavelength of light transmitting the coloration region is in the range of 485 to 535 nm, and more preferably, in the range of 495 to 520 nm. The coloration region of color different from colors selected from among colors ranging from blue to yellow includes the coloration layer in which the peak of the wavelength of light transmitting the coloration region is in the range of 500 to 590 nm, and more preferably, in the range of 510 to 585 nm, or in the range of 530 to 565 nm.

Next, the coloration region is described by using the xy chromaticity diagram. The blue-system coloration region is in the range of $x \leq 0.151$ and $y \leq 0.056$, and more preferably, in the range of $0.134 \leq x \leq 0.151$ and $0.034 \leq y \leq 0.056$. The red-system coloration region is in the range of $0.643 \leq x \leq 0.333$, and more preferably, in the range of $0.643 \leq x \leq 0.690$ and $0.299 \leq y \leq 0.333$. The coloration region selected from among colors ranging from blue to yellow is in the range of $x \leq 0.164$ and $0.453 \leq y$, and more preferably, $0.098 \leq x \leq 0.164$ and $0.453 \leq y \leq 0.759$. The coloration region of color different from colors selected from among colors ranging from blue to yellow is in the range of $0.257 \leq x$ and $0.606 \leq y$, and more preferably, in the range of $0.257 \leq x \leq 0.357$ and $0.606 \leq y \leq 0.670$.

In these four-color coloration regions, in case that the sub-pixel thereof has the transmission region and reflection region, the transmission region and reflection region also can be applied in the above-referenced range.

An LED as RGB, a fluorescent tube and an organic EL may be used as a backlight. Otherwise, a white light source may be used as the backlight. Moreover, the white light source may be the white light source generated by a blue light emitter and a YAG fluorescent substance. The followings are preferable as an RGB light source. The peak of the B wavelength is in the range of 435 to 485 nm, the peak of the G wavelength is in the range of 520 to 545 nm and the peak of the R wavelength is in the range of 610 to 650 nm. And if the coloration region is properly chosen by the wavelength of the RGB light source, the wider color reproducibility can be acquired. In addition, for example, the peak of the wavelength thereof is in the range of 450 to 565 nm and the light source having a plurality of peaks may be used.

The construction aspects of the four-color coloration regions are as follows:

(1) Coloration region of red, blue, green and cyan (blue green)

(2) Coloration region of red, blue, green and yellow (3) Coloration region of red, blue, dark green and yellow (4) Coloration region of red, blue, emerald and yellow (5) Coloration region of red, blue, dark green and yellow green (6) Coloration region of red, blue green, dark green and yellow green.

Second Embodiment

Figure 3:
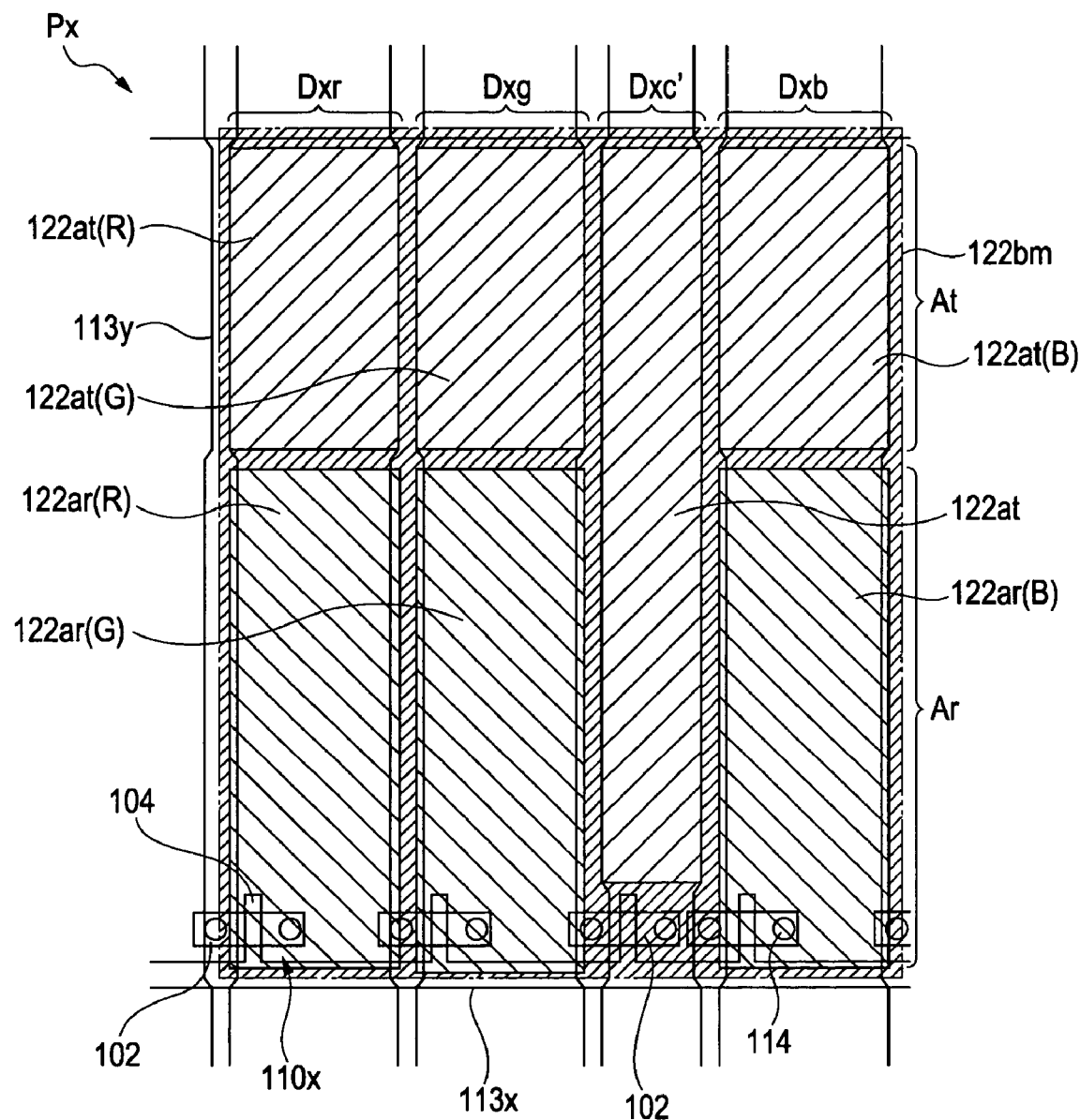
FIG. 3 is a schematic plan view showing the structure of one pixel of the electro-optical device according to a second embodiment of the invention.

Next, Another according to the invention will be described with reference to FIG. 3. FIG. 3 is a schematic plan view showing the pixel structure according to a second embodiment of the invention. In this embodiment, the description is omitted by put the same reference numeral on the same part as the first embodiment described above.

In this embodiment, the sub-pixels Dxr, Dxg and Dxb described above are provided in within one pixel Px, both the light transmission region At and the light reflection region Ar are provided in each of the three sub-pixels and the coloration layers 122at and 122ar are disposed in each region, respectively. Meanwhile, in that only the light transmission region At is substantially provided in the other sub-pixel Dxc' and the coloration layer 122at is formed therein, this embodiment is similar to the first embodiment, but in that the area of the sub-pixel is smaller than that of the other three sub-pixels Dxr, Dxg and Dxb, this embodiment is different from the first embodiment.

In this embodiment, since the light transmission region At of the sub-pixel Dxc' is set to the (approximately) same area as the light transmission region At of the other sub-pixel, the balance is improved in reproducing the color and the increase in the area of one pixel can be reduced by adding the sub-pixel Dxc', whereby there is an advantage that the lowering of the display resolution can be constrained. Particularly, when the light transmission region At of the sub-pixel Dxc' has the same area as the light transmission region At of the other three sub-pixels Dxr, Dxg and Dxb, since the image data is easily generated and each sub-pixel is easily controlled in reproducing a predetermined color by using the four colors, the controllability of the image can be improved.

Further, in this embodiment, the coloration layer 122ar is formed throughout each of the light reflection regions of the three sub-pixels Dxr', Dxg' and Dxb', but a part in which the coloration layer 122ar is not formed may be provided in at least one sub-pixel from among the three sub-pixels as shown in the first embodiment.

Third Embodiment

Figure 4:
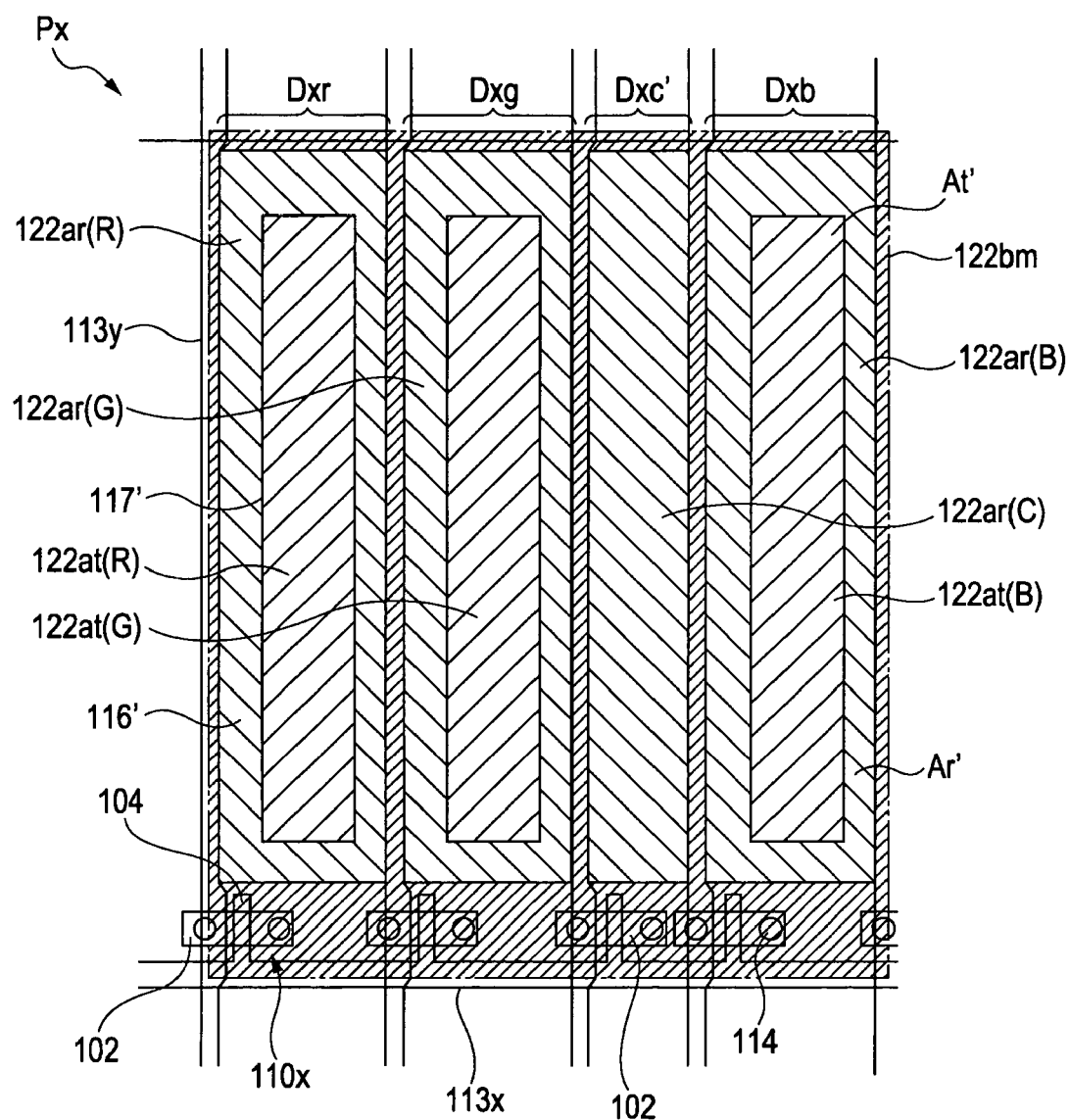
FIG. 4 is a schematic plan view showing the structure of one pixel of the electro-optical device according to a third embodiment of the invention.

FIG. 4 is a schematic plan view of the construction of one pixel according to a further embodiment of the invention. In the second embodiment, the description is omitted by putting the same reference numeral on the part constructed similarly as the some embodiments described above. In this embodiment, in that the light transmission region At' provided in the sub-pixels Dxr', Dxg' and Dxb' is disposed within each sub-pixel and is constructed in an island form at the inside of the light reflection region Ar', this embodiment is different from the above-referenced embodiments. That is, the aperture portion transmitting light is provided in the light reflection layer 116' and is constructed as the light transmission region At'. Accordingly, the light reflection layer 117' is disposed along the periphery of the end portion of sub-pixel with a frame shape within each sub-pixel and the light reflection region Ar' also is set as the region corresponding to the formation of the light reflection layer 117' and is disposed, within the sub-pixel. In this case, the light reflection layer 117' can be conductively connected to the connecting electrode 114 of the TFT 110X as described in this embodiment. As shown above, in case that the light reflection layer 117' acts as the reflection electrode, a part of the electrode 116' regarded as the transparent electrode is laminated onto the light reflection layer 117' (the end portion or edge of the aperture portion), whereby the electrical connection is coordinated, but the electrode 116' may be formed in the region covering the entirety of the light transmission region and light reflection layer 117' (light reflection region).

Moreover, contrary to the construction shown in FIG. 4, the light reflection region within the sub-pixel may be constructed substantially in the middle portion of the sub-pixel in the island shape.

Further, in this embodiment, the coloration layer 122ar is formed throughout each of the light reflection regions of the three sub-pixels Dxr', Dxg' and Dxb', but a part in which the coloration layer 122ar is not formed may be provided in at least one sub-pixel from among the three sub-pixels as shown in the first embodiment.

Electronic Apparatus

Figure 7:
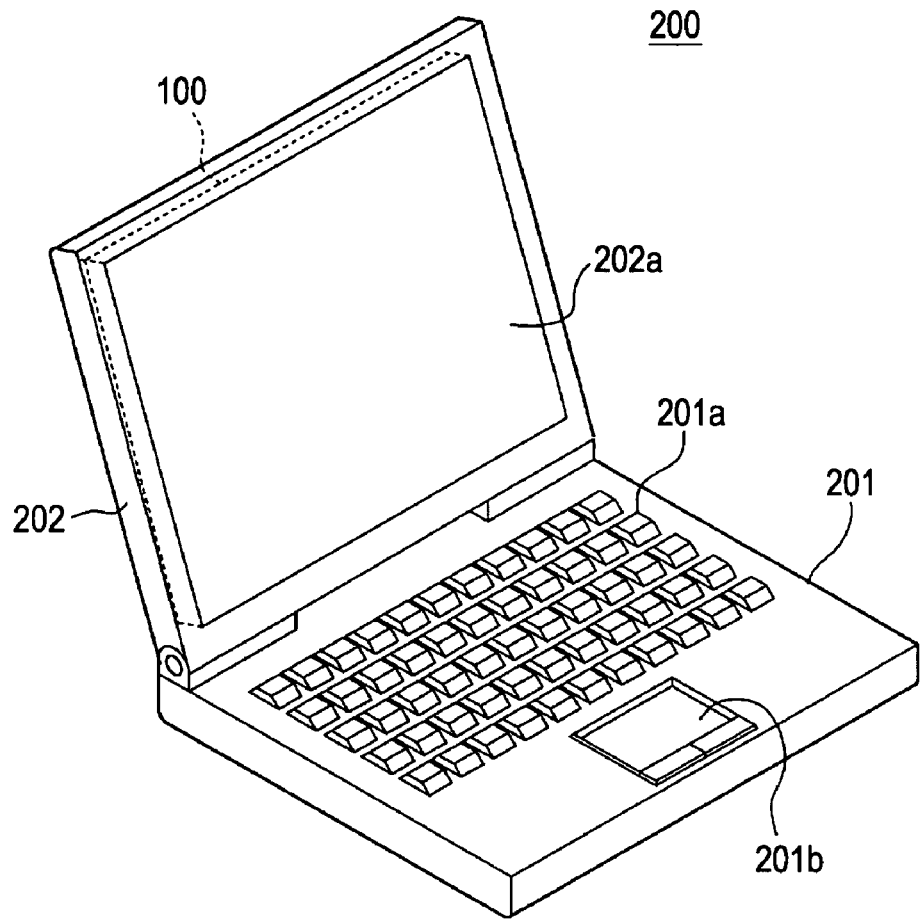
FIG. 7 is a schematic perspective view showing an aspect of the electronic apparatus according to the embodiment of the invention.

Finally, there will be described the embodiment using the electro-optical device for the electronic apparatus in accordance with each embodiment specifically described. FIG. 7 shows a note-type personal computer of the electronic apparatus according to an embodiment of the invention. The personal computer 200 has a main unit 201 including a plurality of operating button 201a or other operating device 201b, and a display unit 202 including a display screen 201a, which is connected to the main unit 201. In the embodiment shown above, the main unit 201 and display unit 202 are constructed to be openable and closable. The electro-optical device (liquid crystal device) described above is built-in at the inside of the display unit 202, whereby a desired display image is displayed in the display screen 202a. In this case, a display controlling circuit for controlling the electro-optical device 100 is provided at the inside of the personal computer 200. The display controlling circuit is constructed to determine the displaying form by sending a predetermined control signal to a heretofore known driving circuit (liquid crystal driving circuit) not shown which is not provided in the electro-optical device 100.

Figure 8:
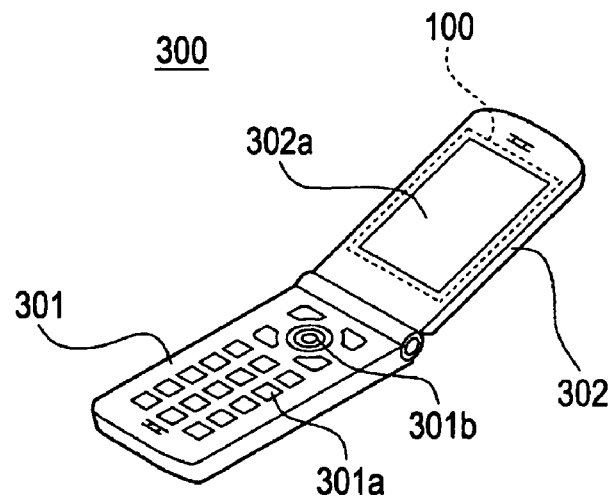
FIG. 8 is a schematic perspective view showing another aspect of the electronic apparatus according the embodiment.

FIG. 8 shows a cellular phone of the electronic apparatus according to another embodiment of the invention. A cellular phone 300 shown heretofore an operating unit 301 having a plurality of operating buttons 301a, 301b and a mouthpiece, and a display unit 302 having a display screen 302a or an earpiece. In addition, the electro-optical device 100 is built-in at the inside of the display unit 302. Further, a display image formed by the electro-optical device 100 can be visible through the display screen of the display unit 302. In this case, the display controlling circuit for controlling the electro-optical device 100 is provided at the inside of the cellular phone 300. The display controlling circuit is constructed to determine the displaying form by sending a predetermined control signal to a heretofore known driving circuit (liquid crystal driving circuit) not shown which is not provided in the electro-optical device 100.

Moreover, the electronic apparatuses according to the invention include a liquid crystal TV, a car navigation device, a pager, an electronic databook, an electronic calculator, a workstation, a video phone and a POS terminal in addition to the electronic apparatus shown in FIG. 7 or 8. And the electro-optical device according to the invention can be used as these various electronic apparatuses.

Further, the invention may be variously modified within the range not departing from the gist of the invention. For example, in this embodiment, the embodiment constructed by the liquid crystal device having a liquid crystal display panel has been described, but the invention may be other electro-optical devices such as the electronic portal imaging device in addition to the liquid crystal device whenever the transmission display and reflection display can be implemented by using the color filter.

What is claimed is:

1. An electro-optical device for implementing color display by transmission display and/or reflection display, comprising:
    a plurality of sub-pixels corresponding to a plurality of colors, each sub-pixel having a coloration layer of one color among the plurality of colors;
    the coloration layers having filter colors of a three-primary-color-system and filter colors of a complementary-color system different from the filter colors of the three-primary-color-system;
    a light transmission region in each of the sub-pixels and a light reflection region in each of the sub-pixels having coloration layers of the three-primary-color-system;
    the coloration layers in the light reflection regions constituting the filter colors of the three-primary-color-system and the coloration layers in the light transmission regions constituting the filter colors of the three-primary-color-system and the filter colors of the complementary-color system different from the filter colors of the three-primary-color-system,
    wherein a sub-pixel having the light transmission region in which the coloration layer of the complementary-color-system filter colors is disposed does not comprise a light reflection region.

2. The electro-optical device according to claim 1, at least one of the complementary-color-system filter colors being cyan.

3. The electro-optical device according to claim 1, an area of the sub-pixel in which the coloration layer of the complementary-color-system filter colors is disposed being smaller than that of the sub-pixels in which the coloration layer of the primary-color-system filter colors are disposed.

4. An electronic apparatus, comprising:
    the electro-optical device according to claim 1; and
    a unit that controls the electro-optical device.

5. An electro-optical device for implementing transmission display and reflection display, comprising:
    sub-pixels corresponding to three colors, each sub-pixel having a coloration layer of one color among the three colors;
    at least one sub-pixel having a coloration layer of a color different from the three colors; and
    a light transmission region in each of the sub-pixels corresponding to the three colors and the at least one sub-pixel and a light reflection region in each of the sub-pixels corresponding to the three colors,
    the coloration layer in each of the sub-pixels is the same in the light transmission region as that in the light reflection region,
    the coloration layer in the at least one sub-pixel is disposed in the light transmission region,
    the transmission display implementing color display using the three colors of the coloration layers disposed in the light transmission regions of the three sub-pixels corresponding to the three colors and the color different from the three colors of the coloration layer disposed in the light transmission region of the at least one sub-pixel, and
    the reflection display implementing color display using the three colors of the coloration layers disposed in the light reflection regions of the three sub-pixels corresponding to the three colors.

6. The electro-optical device according to claim 5, the light transmission region in the at least one sub-pixel having a lager area than the light transmission region in the three sub-pixels corresponding to the three colors.

7. The electro-optical device according to claim 5, the at least one sub-pixel having the same area as the three sub-pixels corresponding to the three colors.

8. The electro-optical device according to claim 5, the at least one sub-pixel having a smaller area than the three sub-pixels corresponding to the three colors.

9. The electro-optical device according to claim 5, the three colors being primary-color-system filter colors and the color different from the three colors being a complementary-color-system filter color.

10. The electro-optical device according to claim 9, the color different from the three colors being cyan.

11. An electro-optical device for implementing color display by transmission display and/or reflection display, comprising:
    a plurality of sub-pixels having a light transmission region and a li&t reflection region; and
    a sub-pixel having a light transmission region,
    the plurality of sub-pixels and the sub-pixel corresponding to a plurality of colors, each of the plurality of sub-pixels and the sub-pixel having a coloration region of one color among the plurality of colors,
    the coloration regions including a coloration region of a blue-color-system color, a coloration region of a red-color-system color, and coloration regions of two colors selected from among colors ranging from blue to yellow in the range of visible light in which the color is changed in accordance with wavelength,
    the coloration regions in the light reflection regions constituting the coloration region of the blue-color-system color, the coloration region of the red-color-system color, and one of the coloration regions of the two colors selected from among the colors ranging from blue to yellow, the coloration regions in the light transmission regions constituting the coloration region of the blue-color-system color, the coloration region of the red-color-system color, and the coloration regions of the two colors selected from among the colors ranging from blue to yellow, and wherein a sub-pixel having a coloration region that constitutes the one of the coloration regions of the two colors selected from among the colors ranging from blue to yellow does not comprise a light reflection region for reflection display.

12. The electro-optical device according to claim 11, the coloration regions of the two colors selected from among colors ranging from blue to yellow corresponding to the coloration region of colors ranging from blue to green and the coloration region of colors ranging from green to orange.

13. The electro-optical device according to claim 11, the coloration region including:
   a first coloration region in which a first peak of a wavelength of light is in a range of 415 to 500 nm,
   a second coloration region in which a second peak is in a range of 600 nm or higher,
   a third coloration region in which a third peak is in a range of 485 to 535 nm, and
   a fourth coloration region in which a fourth peak is in a range of 500 to 590
   the coloration region in the light reflection region including:
      the first coloration region,
      the second coloration region, and
      one of the third coloration region and the fourth coloration region; and
   the coloration region in the light transmission region including:
      the first coloration region,
      the second coloration region,
      the third coloration region, and
      the fourth coloration region.

14. The electro-optical device according to claim 13, the third coloration region being the coloration region in which the third peak of the wavelength of light is in the range of 495 to 520 nm and the fourth coloration region is the coloration region in which the fourth peak of the wavelength of light is in the range of 510 to 585 nm.

15. The electro-optical device according to claim 13, the light reflection region for the reflection display not being provided in the sub-pixel having the light transmission in which the one of the third coloration region and the fourth coloration region is disposed.

16. The electro-optical device according to claim 11, an area of the sub-pixel in which the light reflection region for reflection display is not provided being smaller than that of the pixel in which the light reflection region for reflection display is provided.

17. An electro-optical device for implementing transmission display by a light transmission region and reflection display by a light reflection region, comprising:
   sub-pixels corresponding to three colors, each sub-pixel having a coloration region of one color among the three colors;
   at least one sub-pixel having a coloration region of one color different from the three colors; and
   a light transmission region in the sub-pixels corresponding to the three colors and the at least one sub-pixel and a light reflection region in each of the sub-pixels corresponding to the three colors,
   the coloration region in each of the sub-pixels is the same in the light transmission region as that in the light reflection region,
   the coloration region in the at least one subpixel is disposed in the light transmission region,
   wherein the transmission display implements color display using the three colors of the coloration regions disposed in the light transmission regions of the three sub-pixels corresponding to the three colors and the color different from the three colors of the coloration regions disposed in the light transmission regions of the at least one sub-pixel, and
   the reflection display implements color display using the three colors of the coloration regions disposed in the light reflection region of the three sub-pixels corresponding to the three colors.

18. The electro-optical device according to claim 17, the light transmission region in the at least one sub-pixel having a larger area than the light transmission region of the three sub-pixels corresponding to the three colors.

19. The electro-optical device according to claim 17, the at least one sub-pixel having a same area as the three sub-pixels corresponding to the three colors.

20. The electro-optical device according to claim 17, the at least one sub-pixel having a smaller area than the three sub-pixels corresponding to the three colors.

21. The electro-optical device according to claim 17, the coloration region corresponding to the three colors including
   a coloration region of a blue-color-system color;
   a coloration region of a red-color-system color and one of two colors selected from among colors ranging from blue to yellow in the range of visible light in which the color is changed in correspondence with wavelength; and
   the coloration region corresponding to color different from the three colors including one of the coloration regions of the two colors selected from among the colors ranging from blue to yellow.

22. The electro-optical device according to claim 21, the coloration region of two colors selected from among colors ranging from blue to yellow corresponding to the coloration region of colors from blue to green and the coloration region of colors from green to orange.

23. The electro-optical device according to claim 17, the coloration region corresponding to the three colors including:
   a first coloration region in which a first peak of the wavelength of light is in the range of 415 to 500 nm;
   a second coloration region in which a second peak is in the range of 600 nm or higher;
   one of a third coloration region in which a third peak is in the range of 485 to 535 nm or a fourth coloration region in which a fourth peak is in the range of 500 to 590 nm; and
   the coloration region corresponding to colors different from the three colors including one of the third coloration region and the fourth coloration region.

24. The electro-optical device according to claim 23, the third coloration region being the coloration region in which third peak of the wavelength of light is in the range of 495 to 520 nm and the fourth coloration region is the coloration region in which the fourth peak of the wavelength of light is in the range of 510 to 585 nm.

* * * * *